US008345153B2

(12) United States Patent
Liu et al.

(10) Patent No.: US 8,345,153 B2
(45) Date of Patent: Jan. 1, 2013

(54) CAMERA SYSTEM AND ITS CONTROL METHOD

(75) Inventors: Zhangzhe Liu, Beijing (CN); Congxing Ouyang, Beijing (CN); Han Li, Beijing (CN); Guanghai Zhang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 899 days.

(21) Appl. No.: 12/302,485

(22) PCT Filed: May 29, 2007

(86) PCT No.: PCT/CN2007/001738
§ 371 (c)(1),
(2), (4) Date: Nov. 25, 2008

(87) PCT Pub. No.: WO2007/137514
PCT Pub. Date: Dec. 6, 2007

(65) Prior Publication Data
US 2009/0237512 A1 Sep. 24, 2009

(51) Int. Cl.
*H04N 5/225* (2006.01)
(52) U.S. Cl. .................. 348/372; 348/211.1; 348/211.4
(58) Field of Classification Search ............ 348/211.99, 348/211.3, 211.4, 211.5, 211.6, 372; 370/338; 375/240.1; 725/79
See application file for complete search history.

(56) References Cited

U.S. PATENT DOCUMENTS

| 2005/0015805 A1* | 1/2005 | Iwamura | 725/79 |
| 2005/0018766 A1* | 1/2005 | Iwamura | 375/240.01 |
| 2005/0047379 A1 | 3/2005 | Boyden et al. | |

FOREIGN PATENT DOCUMENTS

| CN | 1497951 A | 5/2004 |
| CN | 1610282 A | 4/2005 |
| CN | 1691810 A | 11/2005 |
| CN | 1852402 A | 10/2006 |
| JP | 6038087 A | 2/1994 |

* cited by examiner

*Primary Examiner* — Tuan Ho
(74) *Attorney, Agent, or Firm* — Fay Kaplun & Marcin, LLP

(57) ABSTRACT

A camera system according to an embodiment includes a camera device, a control device, and an application server. The camera device, which includes a camera module and a power line communication (PLC) camera adaptation module, captures and provides audio/video information. The camera device modulates the audio/video information, and provides the modulated information. The camera device also demodulates the modulated signal transferred from a power line to obtain a control signal, and adjusts camera parameters according to the control signal. The control device is connected to the PLC camera adaptation module via the power line. The control device demodulates a received modulated signal of the audio/video information, and provides the demodulated signal. According to a received control indication information, the control device generates a control signal, modulates the control signal, and controls the camera module. The application server stores and provides the audio/video information, camera device information and controlling purview information of the camera device. The application server also generates and provides the control indication information. A method for controlling camera is also disclosed. Embodiments of the present invention can control the camera device remotely without using a dedicated signal line.

18 Claims, 9 Drawing Sheets

CAMERA SYSTEM AND ITS CONTROL METHOD

FIELD OF THE INVENTION

The present invention relates to a camera system and a method for controlling camera. In particular, the present invention relates to a camera device that can be remotely controlled by a mobile terminal without using a dedicated signal line, a camera system including the camera device, and a method for remotely controlling the camera device using a mobile terminal.

BACKGROUND OF THE INVENTION

With the increasing popularity of digital products, camera devices have become the primary choice for recording and storing information by households and corporations. A user can conveniently record video, audio, or composite audio/video information using these camera devices. Existing camera system usually comprises of a camera device which is located at the site of the camera, and a control device which controls the camera device. The camera device and the control device are usually connected by means of a power line and a dedicated signal line (such as a video cable), or by means of a special signal line (such as a USB cable) that also can provide power to the devices. The user can use the control device to control various camera parameters of the camera device, such as the camera angle, the focal length, the light sensitivity, and the produced media type etc., so as to meet different users' needs.

Existing camera systems and their control methods have the following shortcomings:

1. A dedicated signal line must be used to connect the camera device and the control device, however, when there is a relatively long distance between the camera device and the control device, for example when the two devices are not located in the same room, it is difficult to deploy a dedicated signal line between the devices, thus causing inconvenience to the user.

2. Because a dedicated signal line must be used to connect the camera device and the control device, the distance between these two devices is limited. If camera parameters such as the camera angle, the focal length, the light sensitivity or the produced media type need to be changed, the user must operate the control device at the site of the camera. Hence the camera device can not be remotely operated or controlled, causing inconvenience to the user.

SUMMARY

The purpose of the present invention is to improve prior art camera systems, where a dedicated signal line is needed to connect the camera device and the control device, and where the camera device can not be remotely controlled. The present invention provides a camera device, a camera system including the camera device, and a camera control method for using the camera system to control the camera device, so that a dedicated signal line is not needed for connecting the camera device and the control device, and the camera device may be remotely controlled, thus providing convenience to the user.

The present invention provides a camera device which includes a camera module, wherein the camera module is connected to a power line communication (PLC) camera adaptation module; the power line communication camera adaptation module is used for receiving audio/video information produced by the camera module, modulating the audio/video information and then transmitting the modulated audio/video information through the power line; the power line communication camera adaptation module is also used for demodulating the modulated signal of a control signal transferred via the power line to obtain the control signal, and using the control signal to control the camera module; wherein the PLC camera adaptation module includes a first power line communication modulation/demodulation unit, which is used for modulating the Ethernet signal of the audio/video information, loading the Ethernet signal onto a carrier for transmission, and also used for demodulating the received modulated signal of the control signal, converting the control signal into an Ethernet signal and transmitting the Ethernet signal.

The PLC camera adaptation module further includes:

a camera signal processing unit connected to the camera module, which is used for converting the audio/video information into a digital multimedia signal;

a digital multimedia signal compression processing unit connected to the camera signal processing unit, which is used for compressing the digital multimedia signal;

an Ethernet adaptation unit connected to the digital multimedia signal compression processing unit and the camera module, which is used for converting the compressed digital multimedia signal into an Ethernet signal and sending the Ethernet signal to the first power line communication modulation/demodulation unit, and also used for transmitting received control signal to the camera module; and the first power line communication modulation/demodulation unit connected to the Ethernet adaptation unit, which is used for modulating the Ethernet signal transmitted by the Ethernet adaptation unit and transmitting the Ethernet signal to the Ethernet adaptation unit.

The present invention also provides a camera system, which includes:

a camera device, including a camera module and a power line communication camera adaptation module; the camera device is used for producing audio/video information; the power line communication camera adaptation module is used for receiving audio/video information produced by the camera module, modulating the audio/video information, and transmitting the modulated audio/video information through a power line; the power line communication camera adaptation module is also used for demodulating the modulated signal of a control signal transferred via a power line to obtain the control signal, and using the control signal to control the camera module;

a control device connected to the power line communication camera adaptation module via a power line, which is used for demodulating the received modulated signal of the audio/video information, and sending out the audio/video information obtained after demodulation; the control device is also used for generating a control signal based on the received control indication information, modulating the control signal, and transmitting the modulated signal of the control signal through a power line to the power line communication camera adaptation module, so as to control the camera module; and an application server connected to the control device, which is used for storing and providing the audio/video information, the camera device information and control purview information of the camera device, and also used for sending control indication information to the control device.

The control device includes:

a main processing unit connected to the application server, which is used for receiving and sending audio/video information, generating the control signal based on the control indication information sent by the application server and sending out the control signal;

an Ethernet signal processing unit connected to the main processing unit, which is used for converting the received Ethernet signal into digital audio/video information, transmitting the digital audio/video information to the main processing unit, and converting the control signal sent by the main processing unit into an Ethernet signal for transmission; and a second power line communication modulation/demodulation unit connected to the Ethernet signal processing unit, which is used for modulating the control signal in the Ethernet signal, loading the control signal onto a carrier for transmission, and also used for demodulating the received modulated signal of audio/video information, converting the demodulated audio/video information into an Ethernet signal for transmitting to the Ethernet signal processing unit.

When the camera module of the camera device and the power line communication camera adaptation module of the camera device both possess a USB interface, the power line communication camera adaptation module with the USB interface includes:

a USB adaptation unit connected to the camera device with USB interface, which is used for combining USB signals with the USB power, and separating USB signals from the USB power, the USB signal includes audio/video information and control signal;

a first USB signal Ethernet adaptation unit connected to the USB adaptation unit, which is used for converting between USB signal and Ethernet signal, and sending out the converted Ethernet signal;

a USB power adaptation unit connected to the USB adaptation unit, which is used for converting between USB power and alternating current power; and a first power line communication modulation/demodulation unit connected to the first USB signal Ethernet adaptation unit and the USB power adaptation unit, which is used for modulating the Ethernet signal transmitted by the first USB signal Ethernet adaptation unit, loading the Ethernet signal onto a carrier for transmission, and also used for demodulating the received modulated signal of control signal, converting the control signal into an Ethernet signal for transmitting to the first USB signal Ethernet adaptation unit.

When the camera module of the camera device and the power line communication camera adaptation module of the camera device both possess a USB interface, the control device includes:

a main processing unit connected to the application server, which is used for receiving and transmitting audio/video information, generating the control signal based on the control indication information sent by the application server and sending out the control signal;

a second USB signal Ethernet adaptation unit connected to the main processing unit, which is used for converting between USB signal and Ethernet signal; and a second power line communication modulation/demodulation unit connected to the second USB signal Ethernet adaptation unit, which is used for modulating the control signal in an Ethernet signal, loading the control signal onto a carrier for transmission, and also used for demodulating the received modulated signal of audio/video information, converting the demodulated audio/video information into an Ethernet signal for transmitting to the second USB signal Ethernet adaptation unit.

The application server includes:

an information database, is used for storing the audio/video information produced by the camera device, the camera device information and controlling purview information of the camera device; and an information processing module connected to the information database and the control device, which is used for storing the audio/video information sent by the control device into the information database, publishing the audio/video information, generating control indication information based on received request information, and transmitting the control indication information to the control device.

The present invention further provides a method for controlling camera, which includes:

Step 1, a mobile terminal transmits request information to an application server for adjusting camera parameters of a camera device; the request information carries identification information of the camera device;

Step 2, the application server generates control indication information based on the request information, and transmits the control indication information and the identification information to a control device; and Step 3, the control device generates control signal based on the control indication information, modulates the control signal, and transmits the modulated signal of the control signal through power line to the camera device identified by the identification information, so as to adjust camera parameters of the camera device.

The present invention has the following advantages:

1. The first power line communication modulation/demodulation unit in the camera device may modulate the audio/video information recorded by the camera, load the audio/video information onto a power line, and transmit the audio/video information to the control device; the second power line communication modulation/demodulation unit in the control device may modulate the control signal, load the control signal onto the power line and transmit the control signal to the camera device. As a result, a dedicated signal line connecting the camera device and the control device is not needed, thus saving the cost of the signal line and eliminating the trouble of installing the signal line. Furthermore, since power lines and power sockets are the most common cable system in households and corporations, the camera device and the control device can be flexibly placed at different locations in households and corporations etc., thus providing convenience to the user.

2. With the rapid development of communication technology and the widespread use of mobile terminals, the present invention combines the technologies of mobile communication and camera to allow remote control and operation of the camera device using the mobile terminal, which provides great convenience and improved usability to the user, for example, the user may use a mobile terminal to remotely adjust/control the camera parameters of a camera device.

The present invention is further described in detail through drawings and embodiments below.

DETAILED DESCRIPTION OF THE EMBODIMENTS

Figure 1:
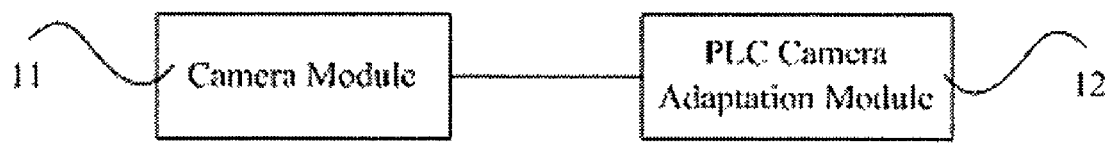
FIG. 1 is a schematic illustration of the structure of a camera device according to one embodiment of the present invention.

FIG. 1 is a schematic illustration of the structure of a camera device according to one embodiment of the present invention. The camera device includes a camera module 11 and a power line communication (PLC) camera adaptation module 12. The camera module 11 is used for producing audio/video information that includes audio, video, images, etc. The PLC camera adaptation module 12 is used for receiving the audio/video information produced by the camera module 11, modulating the audio/video information recorded by the camera module 11, loading the audio/video information onto a power line so as to transmit the audio/video information to a control device that controls the camera device. The PLC camera adaptation module 12 is also used for demodulating a modulated signal of a control signal transmitted by the control device through the power line, and using the control signal obtained by the demodulation to control camera parameters of the camera module 11, such as the camera angle, the focal length, the light sensitivity, and the produced media type, etc., wherein the media type can be video, image, audio, or composite audio/video.

Figure 2:
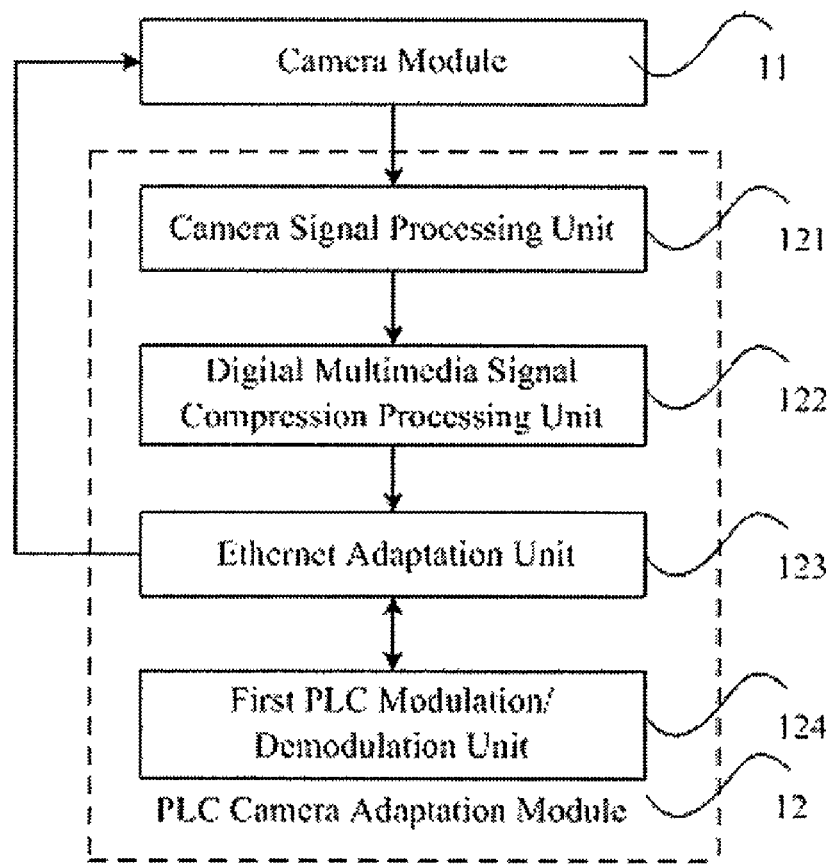
FIG. 2 is a schematic illustration of the structure of a camera device according to another embodiment of the present invention.

FIG. 2 is a schematic illustration of the structure of a camera device according to another embodiment of the present invention. In the camera device, the PLC camera adaptation module 12 includes a camera signal processing unit 121, a digital multimedia signal compression processing unit 122, an Ethernet adaptation unit 123 and a first PLC modulation/demodulation unit 124, and they are connected in turn. The camera signal processing unit 121 is connected to the camera module 11, for converting the audio/video information recorded by the camera module 11 into a digital multimedia signal, and transmitting the digital multimedia signal to the digital multimedia signal compression processing unit 122. The digital multimedia signal compression processing unit 122 is used for compressing the digital multimedia signal and then transmitting the compressed signal to the Ethernet adaptation unit 123. The Ethernet adaptation unit 123 is also connected to the camera module 11, for converting the compressed digital multimedia signal into an Ethernet signal, and transmitting the Ethernet signal to the first PLC modulation/demodulation unit 124. The Ethernet adaptation unit 123 is also for transmitting a control signal sent by the first PLC modulation/demodulation unit 124 to the camera module 11, in order to adjust the camera parameters of the camera module 11. The first PLC modulation/demodulation unit 124 is used for modulating the received Ethernet signal, loading the Ethernet signal onto a carrier, so as to transmit the Ethernet signal through power line to a control device that controls the camera device. The first PLC modulation/demodulation unit 124 is also used for demodulating the modulated signal of the control signal transmitted by the control device through the power line, and converting the demodulated control signal into an Ethernet signal, then transmitting the Ethernet signal to the Ethernet adaptation unit 123.

Since a PLC modulation/demodulation unit is set in the camera device, a live signal recorded by a camera at the site of the camera can be loaded onto the power line and transmitted to a control device, thus a dedicated signal line is not needed for connecting the camera device and the control device, saving the cost of the signal cable, and avoiding the trouble of installing the signal line. At the same time, as power lines and power sockets are the most common cable system in households and corporations, the camera device and the control device can be placed at flexible locations, making them easier for user to use.

Figure 3:
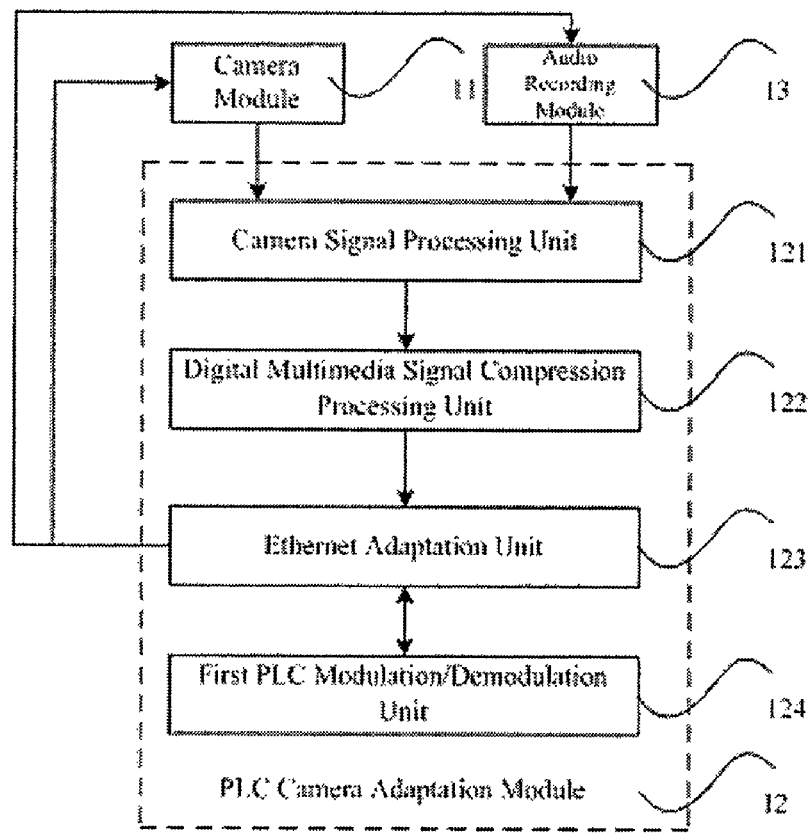
FIG. 3 is a schematic illustration of the structure of a camera device according to yet another embodiment of the present invention.

FIG. 3 is a schematic illustration of the structure of a camera device according to yet another embodiment of the present invention. The camera device further includes an audio recording module 13. The audio recording module 13 is connected to both the camera signal processing unit 121 and the Ethernet adaptation unit 123 of the PLC camera adaptation module 12, for recording audio information at the site of the camera, and transmitting the audio information to the camera signal processing unit 121.

Figure 4:
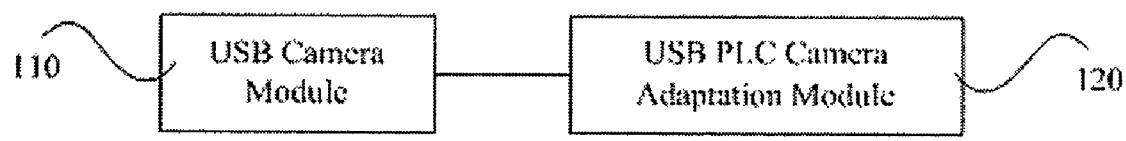
FIG. 4 is a schematic illustration of the structure of a camera device according to yet another embodiment of the present invention.

FIG. 4 is a schematic illustration of the structure of a camera device according to yet another embodiment of the present invention. In the camera device, both of the camera module 11 and the PLC camera adaptation module 12 are extended with a USB interface. In order to distinguish from the camera module 11 and the PLC camera adaptation module 12 that do not have a USB interface, the camera module 11 extended with a USB interface is named USB camera module 110, and the PLC camera adaptation module 12 extended with a USB interface is named USB PLC camera adaptation module 120.

Figure 5:
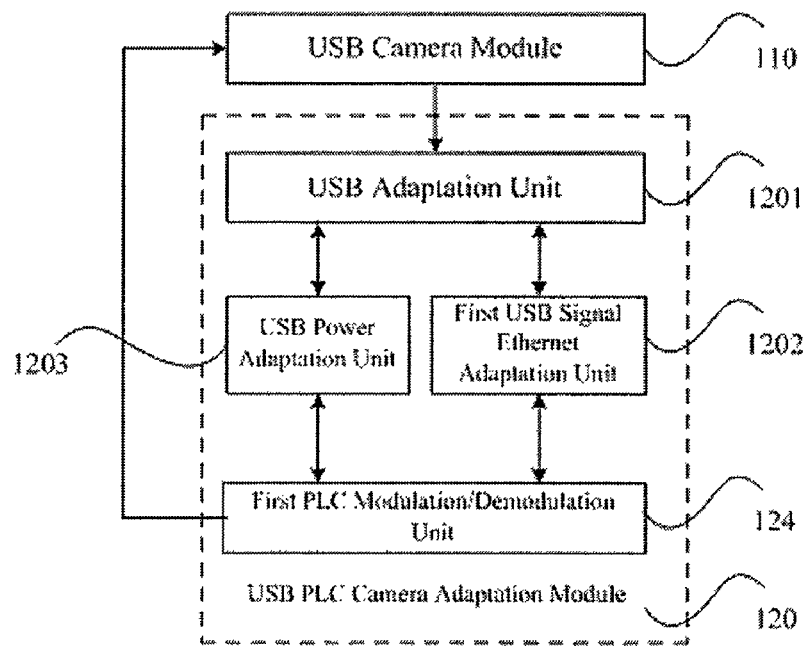
FIG. 5 is a schematic illustration of the structure of a camera device according to yet another embodiment of the present invention.

FIG. 5 is a schematic illustration of the structure of a camera device according to yet another embodiment of the present invention. The USB PLC camera adaptation module 120 of the camera device includes a USB adaptation unit 1201, a first USB signal Ethernet adaptation unit 1202, and a first PLC modulation/demodulation unit 124, and they are connected in turn. Furthermore, the USB PLC camera adaptation module 120 also includes a USB power adaptation unit 1203 that is connected to the USB adaptation unit 1201 and the first PLC modulation/demodulation unit 124, respectively. The USB adaptation unit 1201 is connected to the USB camera module 110, and is used for combining USB signal including audio/video information and control signal with the USB power, and for separating USB signal including audio/video information and control signal from the USB power. The USB adaptation unit 1201 is also used for transmitting the audio/video information recorded by the USB camera module 110 to the first USB signal Ethernet adaptation unit 1202. The USB adaptation unit 1201 is further used for transmitting the control signal sent by the first USB signal Ethernet adaptation unit 1202 to the USB camera module 110, so as to adjust the camera parameters of the USB camera module 110. The first PLC modulation/demodulation unit 124 is used for modulating the received Ethernet signal, loading the Ethernet signal onto a carrier, so as to transmit the Ethernet signal through power line to a control device that controls the USB camera device. The first PLC modulation/demodulation unit 124 is also used for demodulating the modulated signal of a control signal transmitted by the control device through the power line, and converting the demodulated control signal into an Ethernet signal, then transmitting the Ethernet signal to the first USB signal Ethernet adaptation unit 1202. The USB power adaptation unit 1203 is used for the conversion between USB power and alternating current power.

Figure 6:
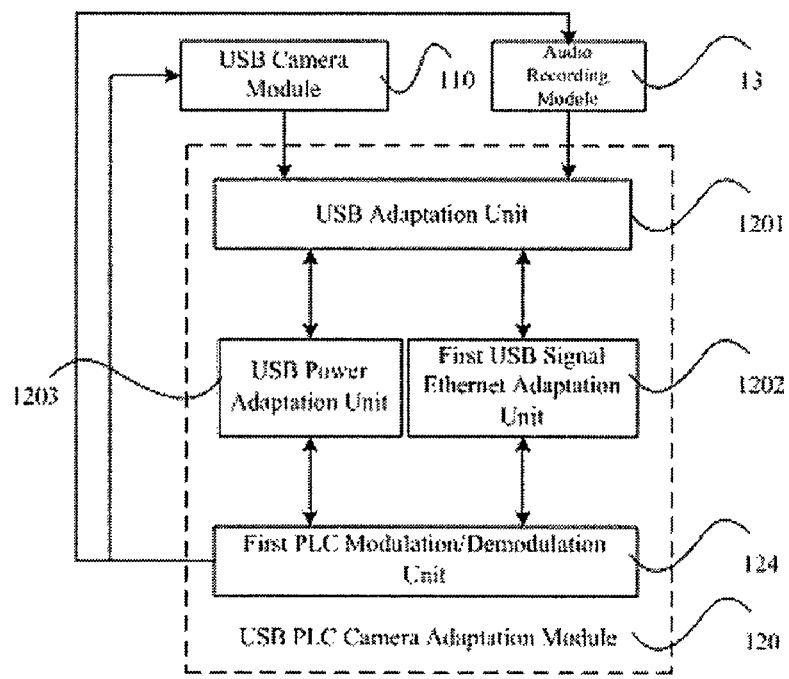
FIG. 6 is a schematic illustration of the structure of a camera device according to yet another embodiment of the present invention.

FIG. 6 is a schematic illustration of the structure of a camera device according to yet another embodiment of the present invention. The camera device further includes an audio recording module 13. The audio recording module 13 is connected to the USB adaptation unit 1201 of the USB PLC camera adaptation module 120, for recording audio information at the site of the recording, and transmitting the audio information to the USB adaptation unit 1201.

Figure 7:
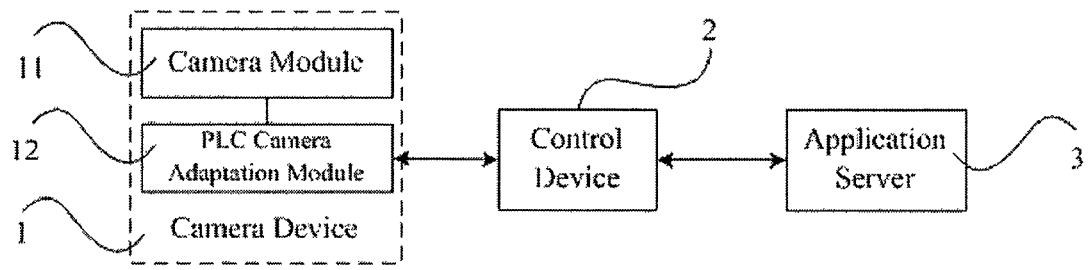
FIG. 7 is a schematic illustration of the structure of a camera system according to an embodiment of the present invention.

FIG. 7 is a schematic illustration of the structure of a camera system according to an embodiment of the present invention. The camera system includes a camera device 1, a control device 2 and an application server 3, and they are connected in turn. The camera device 1 includes the camera module 11 and the PLC camera adaptation module 12 illustrated in FIG. 1. The camera device 1 is used for producing audio/video information, modulating the audio/video information, and sending the modulated audio/video information to the control device 2 through power line. The camera device 1 is also used for demodulating the modulated signal of a control signal transmitted by the control device 2 through the power line, thus obtaining the control signal, and adjusting/controlling camera parameters using the control signal. Once the control device 2 has received the modulated audio/video information signal transmitted through the power line by the PLC camera adaptation module 12, the control device 2 demodulates the modulated signal to obtain the audio/video information, and transmits the audio/video information to the application server 3. Furthermore, the control device 2 also generates a control signal according to the received control indication information, modulates the control signal, and transmits the modulated signal of the control signal to the PLC camera adaptation module 12 through power line, in order to control the camera device 1. The application server 3 is used for storing and providing the audio/video information recorded by the camera device 1, the information of the camera device 1, and the control purview information of the camera device 1. The application server 3 is also used for sending control indication information to the control device 2 based on the request information of a mobile terminal. Furthermore, as an additional function, the application server 3 can also obtain status information of the camera device 1 in real time through the control device 2, and display said status information. For example, the status information may indicate whether or not the camera device 1 is in the working state; the status information may also indicate the camera parameters of the camera device 1 in its current working state, wherein the camera parameters may include the camera angle, the focal length, the light sensitivity, and current media types that may be recorded, such as video, image, audio, or composite audio/video.

Furthermore, any one of the camera devices provided by the embodiments in FIGS. 2-5 may be used as the camera device 1 in the camera system. Accordingly, the control device 2 is connected to the PLC camera adaptation module 12 or to the USB PLC camera adaptation module 120 of the camera device 1, or is further connected to the first PLC modulation/demodulation unit 124.

By combining mobile communication and camera technologies, an application server and a control device are introduced for storing and providing audio/video information recorded by the camera device 1. Hence a user can use a mobile terminal to login on the application server to obtain camera device information and audio/video information, as well as transmit request information to the application server in order to adjust the camera parameters of the camera device. As a result, the implementation of remote control and remote operation of the camera device provides great convenience to the user.

Figure 8:
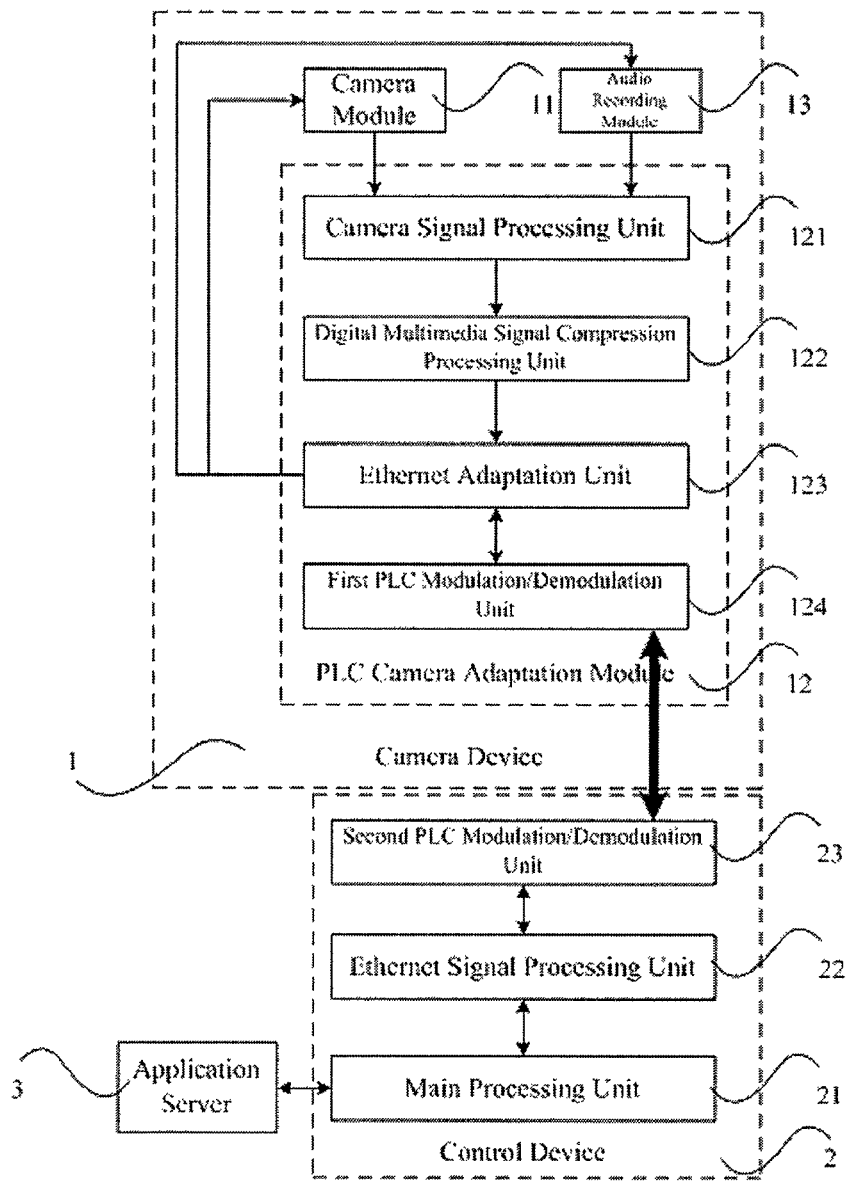
FIG. 8 is a schematic illustration of the structure of a camera system according to another embodiment of the present invention.

FIG. 8 is a schematic illustration of the structure of a camera system according to another embodiment of the present invention. When the camera device 1 is any one of the camera devices shown in FIGS. 1-3, the control device 2 of the camera system includes a main processing unit 21, an Ethernet signal processing unit 22, and a second PLC modulation/demodulation unit 23, and they are connected in turn. The main processing unit 21 is used for uploading the audio/video information, which is transmitted by the Ethernet signal processing unit 22, to the application server 3. The main processing unit 21 is also used for generating a control signal based on the control indication information sent by the application server 3, and transmitting the control signal to the Ethernet signal processing unit 22. The Ethernet signal processing unit 22 is used for converting the control signal transmitted by the main processing unit 21 into an Ethernet signal, and transmitting the Ethernet signal to the second PLC modulation/demodulation unit 23. The Ethernet signal processing unit 22 is also used for converting the Ethernet signal transmitted by the second PLC modulation/demodulation unit 23 into digital audio/video information, and transmitting this information to the main processing unit 21. The second PLC modulation/demodulation unit 23 is used for modulating the control signal in the Ethernet signal, loading the modulated signal onto a carrier, and transmitting the signal to the camera device 1 through power line. The second PLC modulation/demodulation unit 23 is also used for demodulating the modulated audio/video information signal transmitted through the power line by the camera device 1, converting the demodulated audio/video information into an Ethernet signal, and transmitting the Ethernet signal to the Ethernet signal processing unit 22. In detail, the second PLC modulation/demodulation unit 23 exchanges information with the PLC camera adaptation module 12 of the camera device 1, or with the first PLC modulation/demodulation unit 124.

The PLC modulation/demodulation unit of the control device loads the control signal onto a power line to transmit the control signal to the camera device; hence a dedicated signal line is not required for connecting the camera device and the control device, offering convenience to the user.

Figure 9:
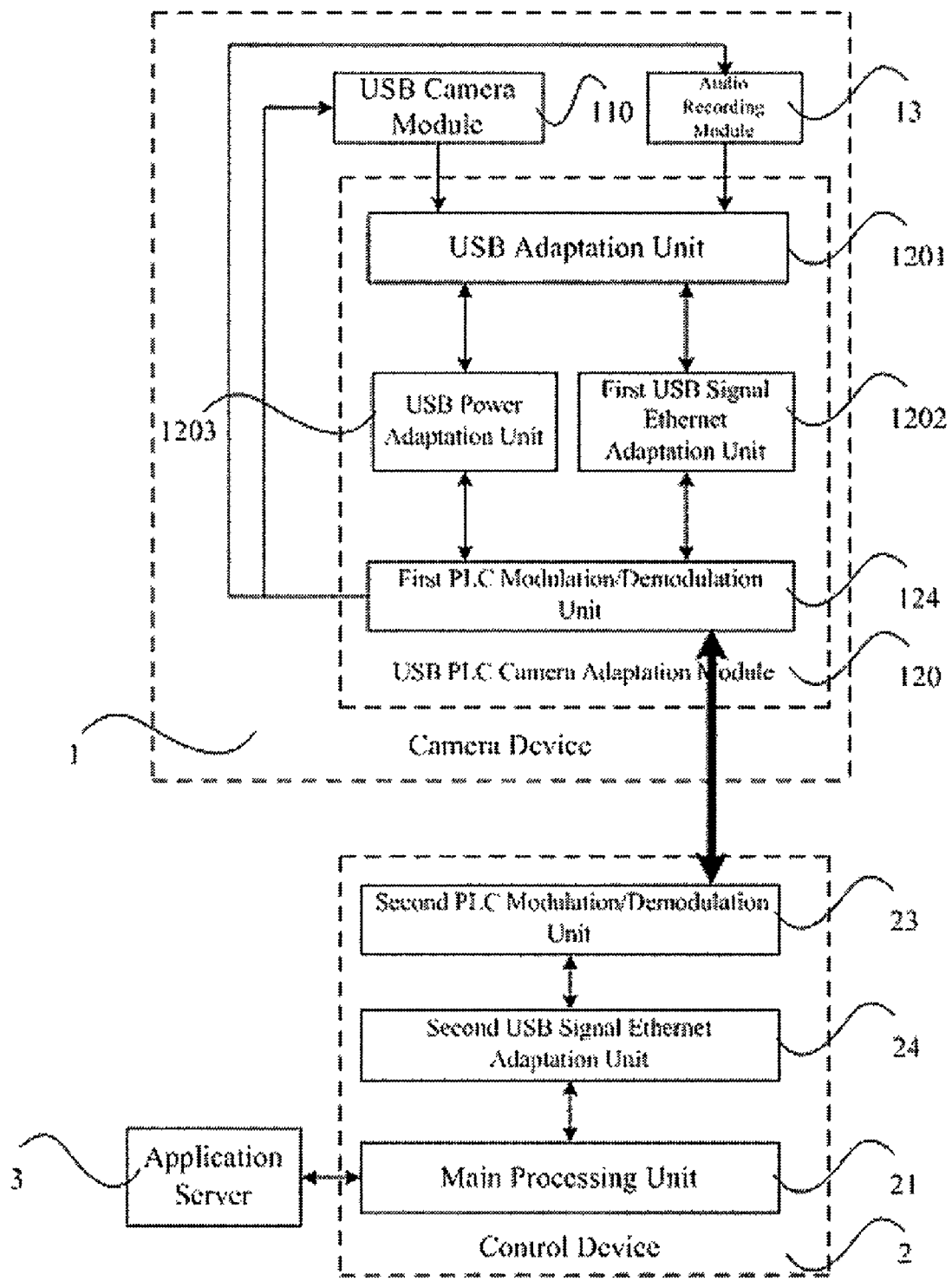
FIG. 9 is a schematic illustration of the structure of a camera system according to yet another embodiment of the present invention.

FIG. 9 is a schematic illustration of the structure of a camera system according to yet another embodiment of the present invention. The control device 2 of the camera system includes a main processing unit 21, a second USB signal Ethernet adaptation unit 24, and a second PLC modulation/ demodulation unit 23, and they are connected in turn. The main processing unit 21 is used for uploading the audio/video information, which is transmitted by the second USB signal Ethernet adaptation unit 24, to the application server 3. The main processing unit 21 is also used for generating a control signal based on the control indication information sent by the application server 3, and transmitting the control signal to the second USB signal Ethernet adaptation unit 24. The second USB signal Ethernet adaptation unit 24 is used for converting the USB signal transmitted by the main processing unit 21 into an Ethernet signal, and transmitting the Ethernet signal to the second PLC modulation/demodulation unit 23. The second USB signal Ethernet adaptation unit 24 is also used for converting the Ethernet signal transmitted by the second PLC modulation/demodulation unit 23 into a USB signal, and transmitting the USB signal to the main processing unit 21. The second PLC modulation/demodulation unit 23 is used for modulating the control signal in the USB signal, loading the modulated signal onto a carrier, and transmitting the signal to the camera device 1 through power line. The second PLC modulation/demodulation unit 23 is also used for demodulating the modulated audio/video information signal transmitted through the power line by the camera device 1, converting the demodulated audio/video information into an Ethernet signal, and transmitting the Ethernet signal to the second USB signal Ethernet adaptation unit 24. In detail, the second PLC modulation/demodulation unit 23 exchanges information with the USB PLC camera adaptation module 120 of the camera device 1, or with the first PLC modulation/demodulation unit 124.

Figure 10:
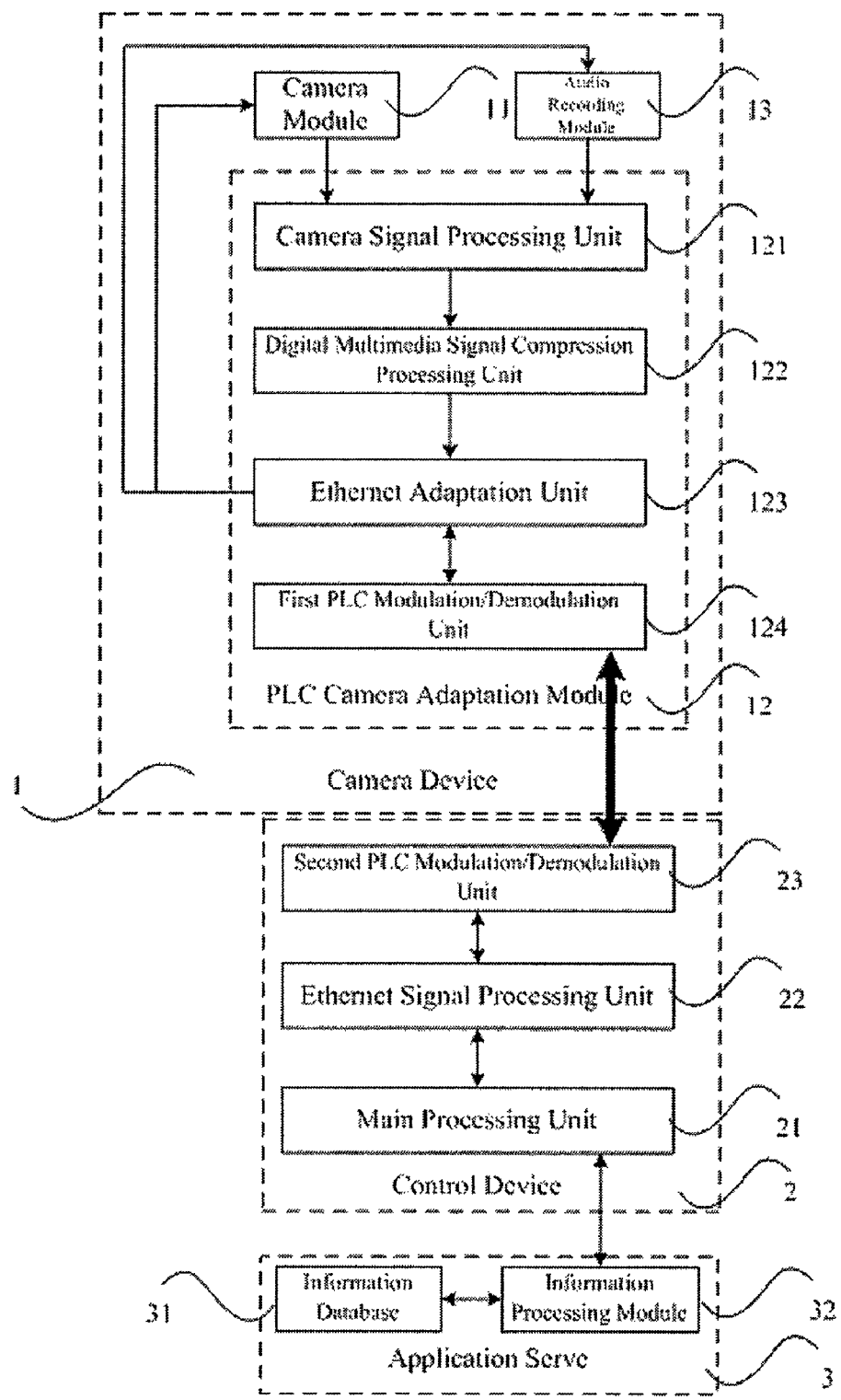
FIG. 10 is a schematic illustration of the structure of a camera system according to yet another embodiment of the present invention.

FIG. 10 is a schematic illustration of the structure of a camera system according to yet another embodiment of the present invention. The application server 3 of the camera system includes an information database 31 and an information processing module 32, both are connected to each other. The information processing module 32 is connected to the main processing unit 21, for storing the audio/video information uploaded by the control device 2 into the information database 31. The information database 31 stores preset information of each camera device, such as address information and identifier information of the camera device. The information database 31 also stores control purview information of each camera device, which indicates the mobile terminals that are authorized to control the camera device, the control purview information records the number information of the mobile terminals that are authorized to control the camera device 1. The information processing module 32 also publishes the audio/video information stored in the information database 31, generates control indication information based on the request information transmitted by the mobile terminal, and transmits the control indication information to the main processing unit 21 of the control device 2. This embodiment uses the camera device 1 shown in FIG. 3 and the control device 2 shown in FIG. 8.

After the recorded audio/video information is stored in the information database 31, the user may use a mobile terminal to login on the application server to select audio/video information that meets certain time conditions and recorded by certain camera device, hence improving the usability of the system.

Figure 11:
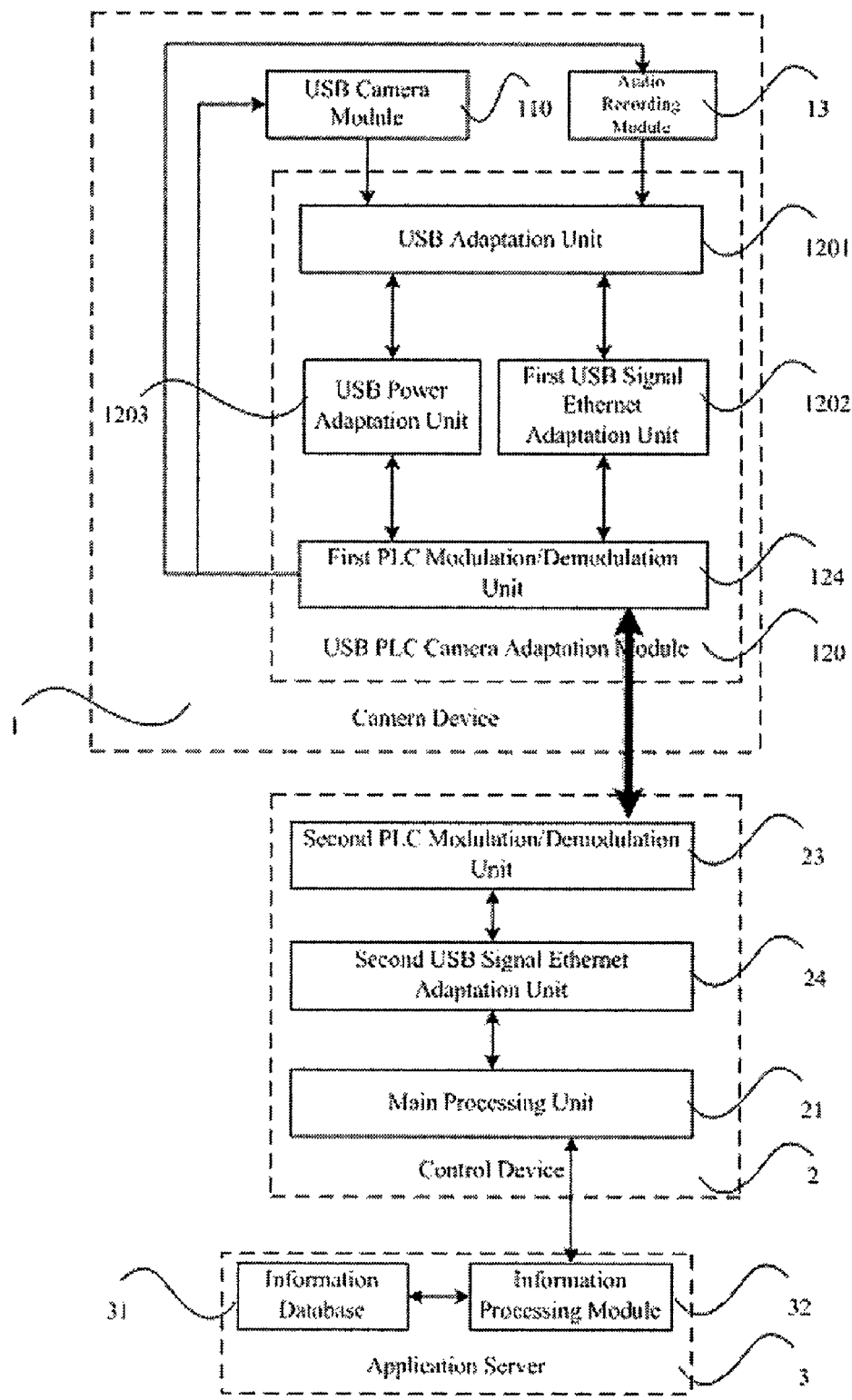
FIG. 11 is a schematic illustration of the structure of a camera system according to yet another embodiment of the present invention.

Furthermore, the camera device 1 shown in FIG. 6 and the control device 2 shown in FIG. 9 may replace the camera device 1 and the control device 2 in FIG. 10, respectively. The structural schematic illustration of the camera system embodiment composed in this way is shown in FIG. 11.

After the audio/video information recorded by the camera device 1 is published by the information processing module 32, the user may use a mobile terminal to login on the application server 3 using the Web or video telephone calls, in order to examine the recorded audio/video information, and to adjust/control the camera parameters of the camera device 1 based on the user needs.

Any one of the systems provided by the embodiments in FIGS. 7-11 may be an instant communication system that is based on IP multimedia subsystem (IMS). The control device 2 communicates with the application server 3 through IP network. The devices in the camera system use Session Initiation Protocol (SIP) based instant communication method to exchange information. In this instant communication system, if a mobile terminal is authorized to control the camera device 1, the mobile terminal may display an image that identifies the camera device 1 when the mobile terminal logs on the application server 3, the image may be a camera so that it can be easily recognized.

Since the various devices in the camera system of the present invention use the SIP based instant communication method to exchange information, the system exhibits excellent time efficiency and interoperability, and can be easily managed by the operation business, thus the management cost is decreased. Furthermore, the camera device 1 is identified by an identifier image on the mobile terminal in the instant communication system, which makes it easier to be managed and controlled by the user of the mobile terminal.

When the user activates the identifier image of the camera device 1 displayed on the screen of the mobile terminal, the mobile terminal transmits request information for obtaining the camera parameters of the camera device 1 to the information processing module 32 of the application server 3, and the request information includes the identification information of the camera device 1. The information processing module 32 obtains the camera parameters of the camera device 1 from the information database 31 according to the identification information, and generates an operation link address which is used for adjusting the various camera parameters. The user of the mobile terminal may adjust the camera parameters of the camera device 1 through this operation link address, hence remotely control the camera device 1.

Figure 12:
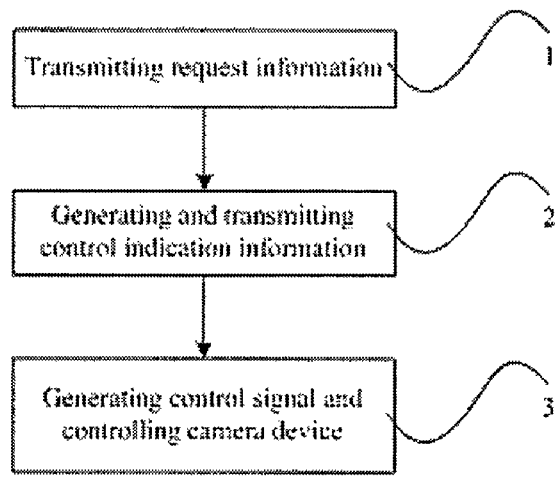
FIG. 12 is a basic flowchart of a camera control method according to one embodiment of the present invention.

FIG. 12 is a basic flowchart of a camera control method according to the present invention, wherein the method includes:

Step 1, a mobile terminal transmits request information to the application server 3 for adjusting the camera parameters of the camera device 1, for example, the request for adjusting the recording focal length to 5 m; the request information carries identification information of the camera device 1, such as XXX;

Step 2, the application server 3 generates control indication information based on the request information, and transmits the control indication information and the identification information to the control device 2; and Step 3, the control device 2 generates control signal based on the control indication information, modulates the control signal, searches for the camera device 1 based on the identification information, and transmits the modulated signal of the control signal through power line to the camera device 1 identified by the identification information, so as to adjust the camera parameters of the camera device 1 according to the control signal.

The ability to remotely control a camera device using a mobile terminal provides great convenience to the user.

In Step 1 of this method, the mobile terminal transmits request information to the information processing module 32 of the application server 3 through the operation link address; wherein the mobile terminal may transmit the request information using the SIP based instant message method. In Step 2, the information processing module 32 generates control indication information based on the request information, and transmits the control indication information and the identification information to the control device 2. In detail, the information processing module 32 uses SIP to transmit the control indication information and the identification information to the main processing unit 21 of the control device 2.

Furthermore, between Step 1 and Step 2, an operation of deciding whether or not a mobile terminal is authorized to control the camera device 1 is performed based on the number information of the mobile terminal; if the mobile terminal is authorized, then execute Step 2; otherwise, the process is terminated. The deciding process is performed as follows: after the request information for adjusting the camera parameters of the camera device 1 is received by the information processing module 32, the information processing module 32 uses the identification information of the camera device 1 to query the information database 31 to check whether or not the control purview information of the camera device 1 contains the number information of this mobile terminal; if yes, the mobile terminal is authorized to control the camera device 1, thus performing Step 2; otherwise, the process is terminated.

By checking the authorization status of a mobile terminal, mobile terminals that are not authorized can not control the camera device, thus malicious events are prevented from happening, and the safety of the camera system is improved. Furthermore, the SIP based instant communication method, which is used for controlling the camera device 1, provides easier operation and better efficiency, thus offering better usability to the user and the operation business.

Figure 13:
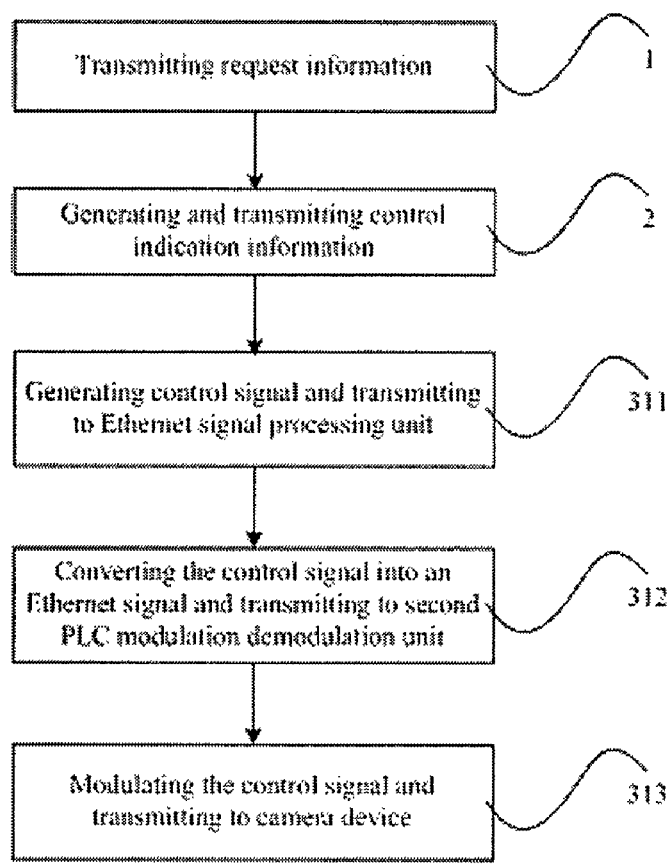
FIG. 13 is a flowchart of a camera control method according to an embodiment of the present invention.

FIG. 13 is a flowchart of a camera control method according to an embodiment of the present invention. In this embodiment, camera parameters can be adjusted through the camera system shown in FIG. 10; Step 1 and Step 2 of the method are identical to the same steps in FIG. 12; Step 3 includes:

Step 311, the main processing unit 21 generates the control signal based on the control indication information, and transmits the control signal to the Ethernet signal processing unit 22;

Step 312, the Ethernet signal processing unit 22 converts the control signal into an Ethernet signal, and transmits the Ethernet signal to the second PLC modulation/demodulation unit 23; and Step 313, the second PLC modulation/demodulation unit 23 modulates the control signal in the Ethernet signal, loads the control signal onto a carrier, and transmits the control signal through power line to the camera device 1 to adjust the camera parameters of the camera device 1 identified by the identification information.

In Step 313, the operation of adjusting the camera parameters of the camera device 1 identified by the identification information further includes:

Step 3131, the second PLC modulation/demodulation unit 23 transmits modulated signal of the control signal to the first PLC modulation/demodulation unit 124 in the camera device 1 identified by the identification information;

Step 3132, the first PLC modulation/demodulation unit 124 demodulates the received modulated signal to obtain the control signal, converts the control signal into an Ethernet signal, and transmits the Ethernet signal to the Ethernet adaptation unit 123; and Step 3133, the Ethernet adaptation unit 123 obtains the control signal from the Ethernet signal, and uses the control signal to adjust camera parameters of the camera module 11.

Figure 14:
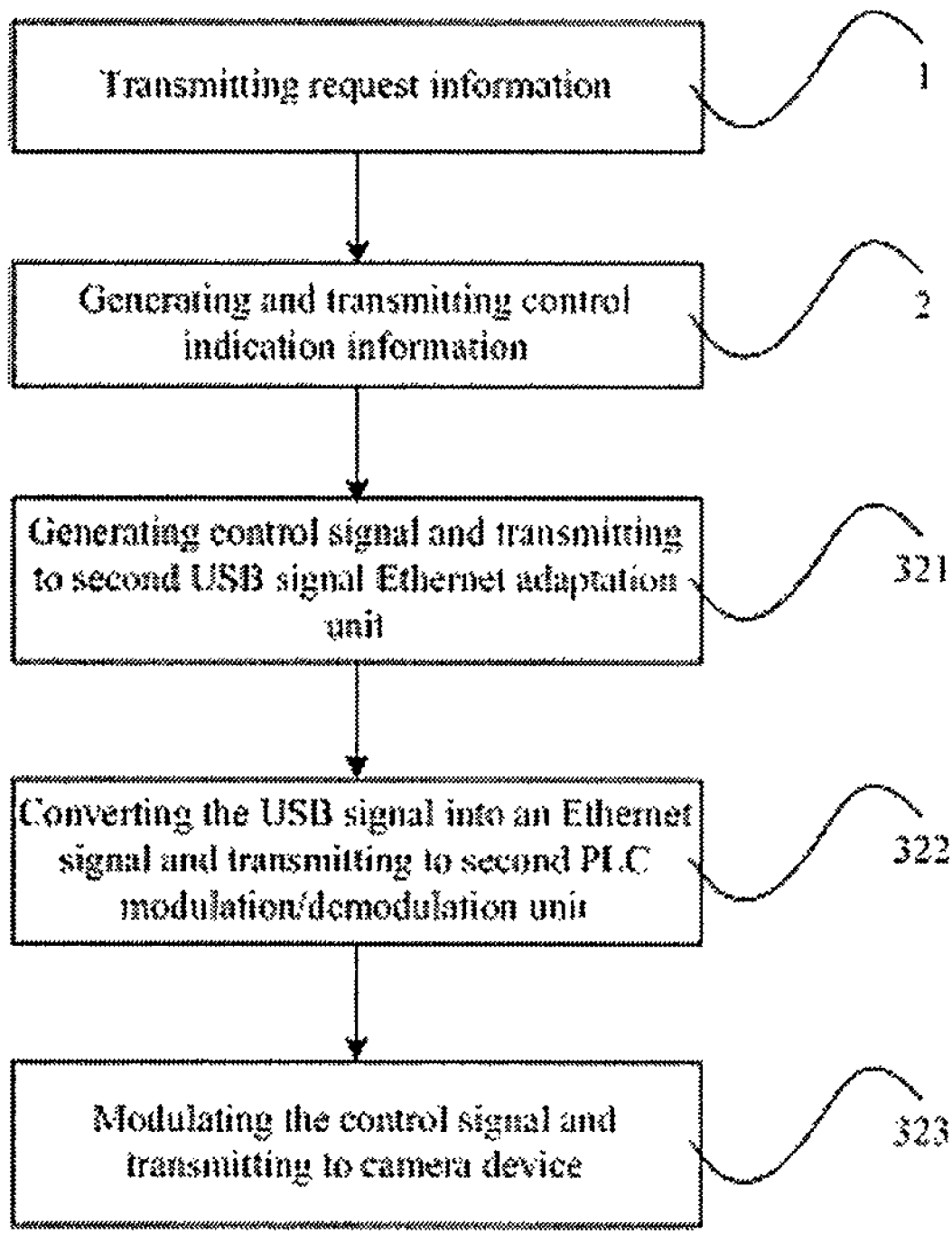
FIG. 14 is a flowchart of a camera control method according to another embodiment of the present invention.

FIG. 14 is a flowchart of a camera control method according to another embodiment of the present invention. In this embodiment, camera parameters can be adjusted through the camera system shown in FIG. 11; Step 1 and Step 2 of the method are identical to the same steps in FIG. 12; Step 3 includes:

Step 321, the main processing unit 21 generates the control signal based on the control indication information, encodes the control signal in a USB signal, and transmits the USB signal to the second USB signal Ethernet adaptation unit 24;

Step 322, the second USB signal Ethernet adaptation unit 24 converts the USB signal into an Ethernet signal, and transmits the Ethernet signal to the second PLC modulation/demodulation unit 23; and Step 323, the second PLC modulation/demodulation unit 23 modulates the control signal in the Ethernet signal, loads the control signal onto a carrier, and transmits the control signal through power line to the camera device 1 to adjust the camera parameters of the camera device 1 identified by the identification information.

In Step 323, the operation of adjusting the camera parameters of the camera device 1 identified by the identification information further includes:

Step 3231, the second PLC modulation/demodulation unit 23 transmits modulated signal of the control signal to the first PLC modulation/demodulation unit 124 in the camera device 1 identified by the identification information; the first PLC modulation/demodulation unit 124 demodulates the received modulated signal to obtain the control signal, converts the control signal into an Ethernet signal, and transmits the Ethernet signal to the first USB signal Ethernet adaptation unit 1202;

Step 3232, the first USB signal Ethernet adaptation unit 1202 converts the Ethernet signal into USB signal, and transmits the USB signal to the USB adaptation unit 1201; and Step 3233, the USB adaptation unit 1201 obtains the control signal from the USB signal, and uses the control signal to adjust camera parameters of the USB camera module 110.

Furthermore, audio/video information can be obtained from the application server 3 using the camera system provided by the present invention. The operation of obtaining audio/video information includes:

A mobile terminal transmits request information through the operation link address to the information processing module 32, so as to obtain audio/video information recorded by the camera device 1. The information processing module 32 uses the identification information "XXX" of the camera device 1 to query the information database 31 to check whether or not the control purview information of the camera device 1 identified by "XXX" contains the number information of the mobile terminal; if yes, the mobile terminal is authorized to control the camera device 1 and obtain audio/video information recorded by the camera device 1, hence the audio/video information corresponding to the identification information of the camera device 1 can be obtained from the information database 31 and sent to the mobile terminal; otherwise, the process is terminated. When the mobile terminal transmits the request information to the information processing module 32 for obtaining audio/video information recorded by the camera device 1, the mobile terminal may also transmit request conditions for the requested audio/video information, such as the date of the recording; if the mobile terminal passed the authorization check, the information processing module 32 will query the information database 31 for the audio/video information that meets the request conditions, and return this audio/video information to the mobile terminal. In detail, the mobile terminal may use SIP to transmit the request information; accordingly, the information processing module 32 may use SIP to transmit the audio/video information to the mobile terminal.

The user may use a mobile terminal to obtain information that meets certain conditions and is recorded by certain camera device from the application server, so the method provides significant convenience to the user.

It should be noted that the above embodiments are only used to describe the technical solutions of the present invention, and they are not used to impose any restriction or limit to the present invention. Despite the present invention having been described in reference to the above embodiments in detail, it should be understood by a person skilled in the art: it is still possible to modify the technical solutions described in the above embodiments, or replace part of the technical features with equivalent ones, while these modifications and replacements do not detach from the spirit and scope of the technical solutions of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

What is claimed is:

1. A camera device, comprising:
    a camera module; and
    a power line communication camera adaptation module connected to the camera module, the power line communication camera adaptation module is used for receive audio/video information recorded by the camera module, modulate the audio/video information, and transmit the audio/video information through a power line, the power line communication camera adaptation module further to demodulate a modulated control signal transmitted through the power line to obtain the control signal, and control the camera module using the control signal, wherein the power line communication camera adaptation module includes:
        a first power line communication modulation/demodulation unit that modulates an Ethernet signal representative of the audio/video information, loads the Ethernet signal onto a carrier for transmission, demodulates the modulated control signal, converts the control signal into a representative Ethernet signal, and transmits the Ethernet signal representative of the control signal.

2. The camera device of claim 1, wherein the power line communication camera adaptation module further includes:
    a camera signal processing unit connected to the camera module to convert the audio/video information into a digital multimedia signal;
    a digital multimedia signal compression processing unit connected to the camera signal processing unit to compress the digital multimedia signal into a compressed digital multimedia signal; and
    an Ethernet adaptation unit connected to the first power line communication modulation/demodulation unit, the digital multimedia signal compression processing unit, and the camera module to convert the compressed digital multimedia signal into a representative Ethernet signal and transmit the Ethernet signal representative of the compressed digital multimedia signal to the first power line communication modulation/demodulation unit, the Ethernet adaptation unit further to transmit the control signal to the camera module, wherein the first power line communication modulation/demodulation unit modulates the Ethernet signal transmitted by the Ethernet adaptation unit, and transmits the Ethernet signal representative of the control signal to the Ethernet adaptation unit.

3. The camera device of claim 2, further comprising: an audio recording module connected to the camera signal processing unit and the Ethernet adaptation unit.

4. The camera device of claim 1, wherein the camera module and the power line communication camera adaptation module includes a respective USB interface.

5. The camera device of claim 4, wherein the power line communication camera adaptation module, which includes a USB interface, further includes:
    a USB adaptation unit connected to the USB interface of the camera module to combine USB signals with USB power and separate USB signals from the USB power, the USB signals including the audio/video information and the control signal;
    a first USB signal Ethernet adaptation unit connected to the USB adaptation unit to convert between a USB signal and an Ethernet signal and transmit the converted Ethernet signal; and
    a USB power adaptation unit connected to the USB adaptation unit to convert between USB power and alternating current power, wherein the first power line communication modulation/demodulation unit is connected to the first USB signal Ethernet adaptation unit and the USB power adaptation unit to modulate the converted Ethernet signal transmitted by the first USB signal Ethernet adaptation unit, and transmit the converted Ethernet signal to the first USB signal Ethernet adaptation unit.

6. A camera system, comprising:
    a camera device including a camera module and a power line communication camera adaptation module, the camera module to provide audio/video information, the power line communication camera adaptation module to receive the audio/video information from the camera module, modulate the audio/video information, and transmit the modulated audio/video information through a power line, the power line communication camera adaptation module further to demodulate a modulated control signal transmitted through the power line to obtain the control signal, and control the camera module using the control signal, wherein the power line communication camera adaptation module includes
        a first power line communication modulation/demodulation unit that modulates an Ethernet signal representative of the audio/video information, loads the Ethernet signal onto a carrier for transmission, demodulates the modulated control signal, converts the control signal into a representative Ethernet signal, and transmits the Ethernet signal representative of the control signal;
    a control device connected to the power line communication camera adaptation module through the power line to demodulate the received modulated signal of the audio/video information, and transmit the demodulated audio/video information, the control device further to generate the control signal based on control indication information, modulate the control signal, and transmit the modulated control signal through the power line to the power line communication camera adaptation module to control the camera module; and
an application server connected to the control device to store and provide the audio/video information, camera device information, and control purview information of the camera device, the application server further to provide the control indication information to the control device.

7. The camera system of claim 6, wherein the power line communication camera adaptation module further includes:
a camera signal processing unit connected to the camera module to convert the audio/video information into a digital multimedia signal;
a digital multimedia signal compression processing unit connected to the camera signal processing unit, to compress the digital multimedia signal into a compressed digital multimedia signal; and
an Ethernet adaptation unit connected to the first power line communication modulation/demodulation unit, the digital multimedia signal compression processing unit, and the camera module to convert the compressed digital multimedia signal into representative Ethernet signal and transmit the Ethernet signal representative of the compressed digital multimedia signal to the first power line communication modulation/demodulation unit, the Ethernet adaptation unit further to transmit the control signal to the camera module,
wherein the first power line communication modulation/demodulation unit modulates the Ethernet signal transmitted by the Ethernet adaptation unit, and transmit the Ethernet signal representative of the control signal to the Ethernet adaptation unit.

8. The camera system of claim 7, wherein the control device includes:
a main processing unit connected to the application server to receive and transmit the audio/video information, generate the control signal based on the control indication information provided by the application server, and transmit the control signal;
an Ethernet signal processing unit connected to the main processing unit further to convert the Ethernet signal into digital audio/video information, transmit the digital audio/video information to the main processing unit, and convert the control signal transmitted by the main processing unit into an Ethernet signal for transmission; and
a second power line communication modulation/demodulation unit connected to the Ethernet signal processing unit, to modulate the control signal in the Ethernet signal, load the control signal onto a carrier for transmission, the second power line communication modulation/demodulation unit further to demodulate the modulated signal of the audio/video information, and convert the demodulated audio/video information into an Ethernet signal for transmitting to the Ethernet signal processing unit.

9. The camera system of claim 6, wherein the camera module and the power line communication camera adaptation module each includes a respective USB interface.

10. The camera system of claim 9, wherein the power line communication camera adaptation module, which includes a USB interface, further includes:
a USB adaptation unit connected to the USB interface of the camera module to combine USB signals with USB power and separate USB signals from the USB power, the USB signals including the audio/video information and the control signal;
a first USB signal Ethernet adaptation unit connected to the USB adaptation unit to convert between a USB signal and an Ethernet signal and transmit the converted Ethernet signal; and
a USB power adaptation unit connected to the USB adaptation unit to convert between USB power and alternating current power,
wherein the first power line communication modulation/demodulation unit is connected to the first USB signal Ethernet adaptation unit and the USB power adaptation unit to modulate the converted Ethernet signal transmitted by the first USB signal Ethernet adaptation unit, and transmit the converted Ethernet signal to the first USB signal Ethernet adaptation unit.

11. The camera system of claim 10, wherein the control device includes:
a main processing unit connected to the application server to receive and transmit the audio/video information, generate the control signal based on the control indication information provided by the application server, and transmit the control signal;
a second USB signal Ethernet adaptation unit connected to the main processing unit to convert between a USB signal and an Ethernet signal; and
a second power line communication modulation/demodulation unit connected to the second USB signal Ethernet adaptation unit to modulate the control signal in the Ethernet signal and load the control signal onto a carrier for transmission, the second power line communication modulation/demodulation unit further to demodulate the modulated audio/video information and convert the demodulated audio/video information signal into an Ethernet signal for transmitting to the second USB signal Ethernet adaptation unit.

12. The camera system of claim 6, wherein the application server includes:
an information database to store the audio/video information provided by the camera device, information of the camera device, and control purview information of the camera device; and
an information processing module connected to the information database and the control device to store the audio/video information from the control device into the information database, publish the audio/video information, generate the control indication information based on a request information, and transmit the control indication information to the control device.

13. A camera control method, comprising:
transmitting a request information from a mobile terminal to an application server to adjust camera parameters of a camera device, the request information including identification information of the camera device;
generating control indication information based on the request information at the application server;
transmitting the control indication information and the identification information to a control device;
generating a control signal at the control device based on the control indication information;
modulating the control signal; and
transmitting the modulated control signal through a power line to the camera device identified by the identification information,
wherein generating a control signal at the control device based on the control indication information comprises generating the control signal at a main processing unit of the control device based on the control indication information and wherein the method further comprises:

converting the control signal into an Ethernet signal;
transmitting the Ethernet signal to a second power line communication modulation/demodulation unit;
modulating the control signal in the Ethernet signal;
loading the control signal onto a carrier; and
adjusting the camera parameters of the camera device using the modulated control signal.

14. The camera control method of claim 13, further comprising:
transmitting the camera parameters and an operation link address to the mobile terminal to adjust the camera parameters in response to receiving the request information at the application server.

15. The camera control method of claim 13, wherein transmitting a request information from a mobile terminal to an application server comprises transmitting the request information using Session Initiation Protocol from the mobile terminal to the application server.

16. The camera control method of claim 13, wherein transmitting the modulated control signal to the camera device comprises transmitting the modulated control signal to an Ethernet signal processing unit of the camera device.

17. The camera control method of claim 13, converting the control signal into an Ethernet signal comprises:
encoding the control signal in a USB signal;
transmitting the USB signal to a second USB signal Ethernet adaptation unit; and
converting the USB signal into an Ethernet signal at the second USB signal Ethernet adaptation unit.

18. The camera control method of claim 13, wherein the request information includes the numerical information of the mobile terminal, and wherein the method further comprises:
determining whether or not the mobile terminal is authorized to control the camera device based on the numerical information of the mobile terminal;
generating the control indication information if the mobile terminal is authorized; and
ceasing to proceed if the mobile terminal is not authorized.

* * * * *